US009928561B2

(12) United States Patent
Filler et al.

(10) Patent No.: US 9,928,561 B2
(45) Date of Patent: Mar. 27, 2018

(54) SERIALIZED DIGITAL WATERMARKING FOR VARIABLE DATA PRINTING

(71) Applicant: Digimarc Corporation, Beaverton, OR (US)

(72) Inventors: Tomas Filler, Beaverton, OR (US); Matthew M. Weaver, Portland, OR (US); Tony F. Rodriguez, Portland, OR (US); Donald Haaga, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 102 days.

(21) Appl. No.: 15/167,932

(22) Filed: May 27, 2016

(65) Prior Publication Data

US 2017/0024845 A1   Jan. 26, 2017

Related U.S. Application Data

(60) Provisional application No. 62/168,694, filed on May 29, 2015.

(51) Int. Cl.
*G06K 9/00* (2006.01)
*G06T 1/00* (2006.01)
*H04N 1/32* (2006.01)
*H04N 1/40* (2006.01)

(52) U.S. Cl.
CPC ............ *G06T 1/0092* (2013.01); *G06T 1/005* (2013.01); *G06T 1/0028* (2013.01); *H04N 1/32* (2013.01); *G06T 2201/0051* (2013.01); *G06T 2201/0202* (2013.01); *G06T 2201/0601* (2013.01)

(58) Field of Classification Search
USPC ....... 382/100, 103, 106, 112, 137, 155, 162, 382/168, 173, 181, 224, 232, 236, 243, 382/254, 274, 276, 312; 713/176; 348/E7.06; 283/113; 358/3.28; 359/2
See application file for complete search history.

(56) References Cited

U.S. PATENT DOCUMENTS

| 6,614,914 | B1 | 9/2003 | Rhoads et al. |
| 6,899,475 | B2 | 5/2005 | Walton |
| 7,142,691 | B2 | 11/2006 | Levy |
| 7,352,878 | B2 | 4/2008 | Reed et al. |

(Continued)

OTHER PUBLICATIONS

International Search Report and Written Opinion dated Sep. 28, 2016, in PCT Application No. PCT/US2016/035064.

(Continued)

*Primary Examiner* — Seyed Azarian
(74) *Attorney, Agent, or Firm* — Digimarc Corporation

(57) ABSTRACT

Digital watermarking is adapted for the variable data printing. A reference signal serves as a proxy for optimizing the embedding a watermark in a host image to be printed. Using the reference signal, embedding parameters are generated, which are a function of constraints such as visual quality and robustness of the machine readable data. Adjustments needed to embed a unique payload in each printed piece are generated using the embedding parameters. These adjustments are stored in a manner that enables them to be efficiently obtained and applied within the RIP or press during operation of the press. Various other methods, system configurations and applications are also detailed.

20 Claims, 9 Drawing Sheets

(56) References Cited

U.S. PATENT DOCUMENTS

| | | | |
|---|---|---|---|
| 7,392,392 B2* | 6/2008 | Levy | G06T 1/0071 |
| | | | 348/E7.06 |
| 7,697,716 B2* | 4/2010 | Miller | G06T 1/0092 |
| | | | 283/113 |
| 8,355,525 B2 | 1/2013 | McKinley et al. | |
| 8,594,364 B2 | 11/2013 | Hein, III et al. | |
| 9,380,186 B2 | 6/2016 | Reed et al. | |
| 9,635,378 B2 | 4/2017 | Holub et al. | |
| 2001/0053237 A1 | 12/2001 | Hashimoto | |
| 2003/0033529 A1 | 2/2003 | Ratnakar et al. | |
| 2003/0033530 A1* | 2/2003 | Sharma | G06K 9/00442 |
| | | | 713/176 |
| 2004/0263911 A1* | 12/2004 | Rodriguez | G06T 1/0021 |
| | | | 358/3.28 |
| 2005/0058481 A1 | 3/2005 | Christiansen et al. | |
| 2005/0063027 A1* | 3/2005 | Durst, Jr. | G06K 7/1417 |
| | | | 359/2 |
| 2007/0247658 A1 | 10/2007 | Barnes | |
| 2007/0253027 A1 | 11/2007 | Hiebert | |
| 2008/0285074 A1 | 11/2008 | Wilson | |
| 2008/0301767 A1 | 12/2008 | Picard et al. | |
| 2008/0304696 A1 | 12/2008 | Eschback et al. | |
| 2009/0116686 A1 | 5/2009 | Samtani | |
| 2010/0103446 A1 | 4/2010 | Bailey | |
| 2010/0150434 A1 | 6/2010 | Reed | |
| 2010/0315666 A1 | 12/2010 | Lazer | |
| 2011/0194152 A1 | 8/2011 | Simske et al. | |
| 2012/0127513 A1 | 5/2012 | Gloukhenki et al. | |
| 2013/0096705 A1 | 4/2013 | Vestergaard et al. | |
| 2014/0002572 A1 | 1/2014 | Liu et al. | |
| 2014/0119593 A1 | 5/2014 | Filler | |
| 2015/0016664 A1 | 1/2015 | Rodriguez | |
| 2015/0116744 A1 | 4/2015 | Bouche et al. | |
| 2016/0217547 A1 | 7/2016 | Stach et al. | |

OTHER PUBLICATIONS

Bailey, "High Performance Variable Data Printing Using PDF", Global Graphics white paper, Mar. 31, 2012.

EFI, "Variable Data Printing", 2005 Electronics for Imaging, Inc., Mar. 15, 2005.

HP SmartStream Designer 5.5 for InDesign CS5 and CS5.5, User guide, Nov. 30, 2011.

* cited by examiner of this method is that running many very large print files can overwhelm the RIP's processing capability. When this happens, printing speeds might become slow enough to be impractical for a print job of more than a few hundred printed pieces.
SERIALIZED DIGITAL WATERMARKING FOR VARIABLE DATA PRINTING

RELATED APPLICATION DATA

This application claims priority to U.S. Provisional Application 62/168,694, filed May 29, 2015, which is hereby incorporated by reference.

TECHNICAL FIELD

The invention relates to variable data printing of machine readable information, and decoding of this information from printed objects.

BACKGROUND AND SUMMARY

Variable data printing (VDP) is a form of printing in which elements such as text, graphics and images may be changed from one printed piece to the next, without stopping or slowing down the printing process using information from a database or external file.

In one method, a static document is loaded into printer memory. The printer is instructed, through the print driver or Raster Image Processor (RIP), to always print the static document when sending any page out to the printer driver or RIP. Variable data can then be printed on top of the static document.

A second method is to combine the static and variable elements into print files, prior to printing, using standard software. This produces a conventional (and potentially huge) print file with every image being merged into every page. A shortcoming of this method is that running many very large print files can overwhelm the RIP's processing capability. When this happens, printing speeds might become slow enough to be impractical for a print job of more than a few hundred printed pieces.

A third method is to combine the static and variable elements into print files, prior to printing, using specialized VDP software. This produces print files, such as Portable Document Format (PDF) (see, in particular, PDF/VT of ISO 16612-2:2010), PostScript or Personalized Print Markup Language (PPML), that offer the potential to improve print speed since the RIP need only process static elements once. There are a variety of optimized print output formats currently in use for VDP, including optimized PDF, PPML, Fiery FreeForm, Creo Variable Print Specification (VPS), Optimized PostScript, Xerox Variable Data Intelligent PostScript Printware (VIPP), Swift Native Accelerated Personalization (SNAP), PPML/VDX, Advanced Function Printing/Intelligent Printer Data Stream (AFP/IPDS), and JLYT.

To illustrate the challenge, consider the case of an HP Indigo Digital Press from HP, Inc. The press prints each color separation at a resolution of 812 Dots Per Inch (DPI) (320 Dots Per Centimeter), which translates to around 640 K of image data per square inch. Now, for a print speed in which the printed output sheet moves at around 30 meters per minute, one can appreciate that there is potentially a tremendous amount of data that needs to be communicated to and updated in memory of the press for variable components in a limited timeframe.

For a variety of applications, it is useful to encode a unique machine readable serial number into each printed piece (or small lot of pieces). One way to accomplish this is to encode a barcode localized to one area on the printed piece. This limits the variable component of each printed piece to that area, which is dedicated to contain only the barcode. With the printing of each piece, a new barcode is generated and applied to the piece, using one of the methodologies summarized above. These localized barcodes, however, suffer from the drawback that they are only readable from one location, which makes them more difficult and slower to read. Often, the barcode is obscured and needs to be moved or imaged from many different perspectives to read it. Repeating the barcodes on several distinct locations may ameliorate this drawback somewhat, but it detracts from the aesthetics of the printed object and interferes with other information printed on it.

Advanced digital signaling schemes, such as digital watermarking and variants thereof, enable machine readable information to be woven across the entire surface of each printed piece, while coexisting other visual elements. Digital watermarking may be used to serialize objects, as described in U.S. Pat. Nos. 8,594,364 and 8,355,525, which are hereby incorporated by reference. However, to be economically viable for commercial printing, new technologies are needed for VDP workflows. Digital watermark signaling has the advantage of weaving digital information robustly and imperceptibly over the entire surface of an object. Yet, this advantage presents a potential challenge in that large portions of the image may need to be changed for each printed item, slowing down the press and increasing computational complexity.

DETAILED DESCRIPTION

In the VDP environment, the printing press has the capability to update the printed image per page through the use of digital press technology. This digital press technology includes, for example, Digital Offset Color (e.g., HP Indigo Digital Offset Color), or liquid electrophotography (LEP), dry toner electrophotography (DEP), and inkjet technology-based digital printing presses.

Figure 1:
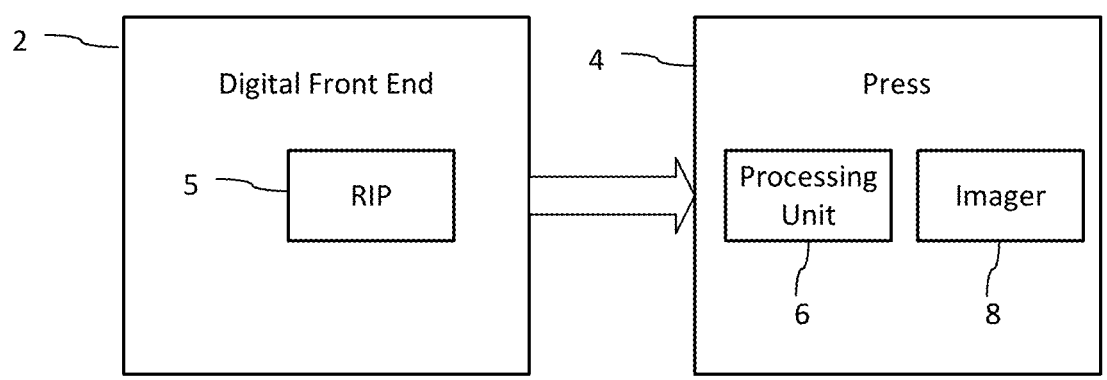
FIG. 1 is a diagram depicting a digital press system used in VDP.

FIG. 1 is a diagram of a digital press system used in VDP. The digital press system includes a Digital Front End (DFE) 2 and a press 4. The DFE prepares digital image data for printing by the press and then transmits the data to the press. In particular, the DFE includes a Raster Image Processor (RIP) 5 that converts images and print instructions specified in a page description language (PDL), like above noted print file formats, into an image format compatible for printing by the press 4. This process of converting the contents of PDL files to bitmaps is sometimes referred to as rasterizing or RIP-ing. The press 4 includes a processing unit 6, which in some of our methodologies, is used to write modified pixels into memory, where a rasterized version of a host image is stored, to create a rasterized image with a unique payload embedded in it. The imager 8 applies this rasterized image to a print medium. In digital presses, the imager creates the printed image directly from the digital data stored in memory of the press. The image output is updated per printed piece by updating the rasterized image in the memory of the press.

For the sake of illustration, we use the example of printing of packaging of a consumer packaged good ("CPG") to describe various embodiments. In this application, the "printed piece" is the printed package, and these printed pieces are printed at high speeds to use the press as efficiently as possible. To identify a CPG uniquely, each printed package is embedded with a different watermark payload. Within each piece, the watermark payload is redundantly encoded in signal blocks inserted across the printed piece, enabling the payload to be extracted from arbitrary, digitally captured image patches of about a square inch. While we refer specifically to CPG packages, our approaches apply to other printed pieces as well, including documents, labels, etc.

Figure 2:
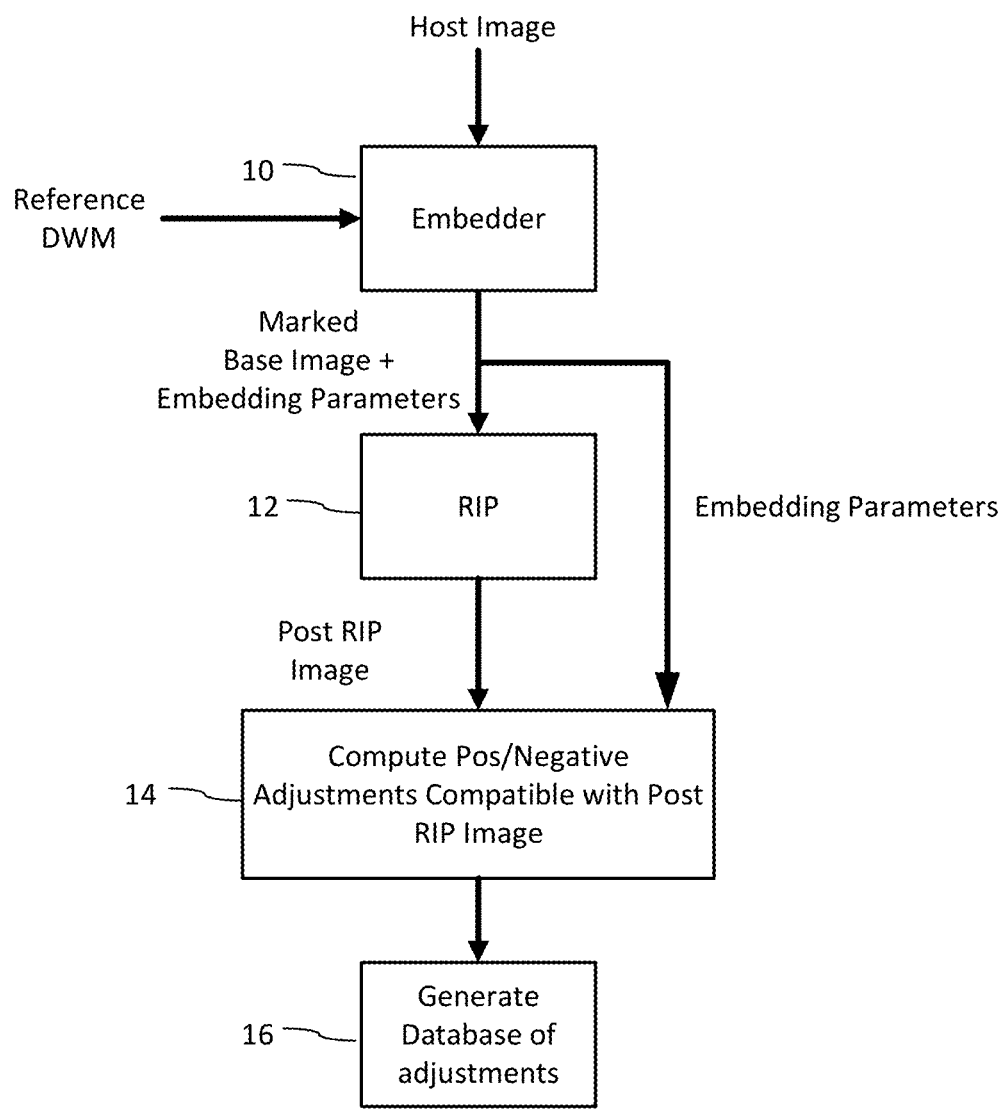
FIG. 2 is a diagram illustrating a pre-processing method to enable efficient embedding of different digital payloads across each printed piece in a VDP environment.

FIG. 2 illustrates a pre-processing method to enable efficient embedding of different watermark payloads in each printed piece in a VDP environment. An objective is to print uniquely marked pieces without degrading press speed or overwhelming the capability of the RIP in the Digital Front End (DFE) of the press to handle image modifications due to the changing watermark payload per piece. In commercial digital printing, maintaining profit margins depends on keeping the digital press working at full speed to maximize production. Due to the generation of a modified image for each printed piece, processing bottlenecks can occur at the RIP and in the communication between the RIP and the press. Processing complexity increases in the RIP when variable components of a page need to be rasterized as the press operates. Further, if substantial amounts of data (e.g., large rasterized images) need to be communicated to the press during printing, this increases complexity and cost of the data transfer, networking and memory components of the system.

The method of FIG. 2 generates image modifications for inserting variable payloads per printed piece. This method enables the modifications to be assembled efficiently in the construction of a final unique image to be printed during operation of the press, without slowing it down or requiring expensive processing capability.

The inputs are a host image and a reference digital watermark signal. For CPGs, the host image of the package design is typically provided in a design file, in a page description language file format like PDF, PostScript, or VDP variants referenced above. It typically is comprised of layers, e.g., corresponding to color separations, such as CMYK, spot colors, or other design features.

In one implementation, the embedder 10 is a software application plug-in for digital imaging software such as Adobe Photoshop or Adobe Illustrator. The embedder includes a user interface that enables the user to specify embedding parameters, such as signal strength and visibility (a visual quality constraint). The user interface further enables the user to control where the watermark signal is to be encoded, in terms of color channel and spatial area within each color channel. The embedder automates the generation of a watermark signal block (sometimes referred to as a tile). It also automates the derivation of visibility metrics based on the host image to control the visual difference caused by modification of the host image to insert the watermark signal. The embedder redundantly encodes the watermark signal blocks in a tiled fashion across the host image in both horizontal and vertical directions. For each instance of the watermark signal, the embedder adapts the watermark signal according to visibility metrics derived from the corresponding host image block, which controls the signal amplitude per color separation in which the embedder inserts the watermark signal. Implementations of this processing modules are detailed in our co-pending applications and patents:

Ser. No. 14/616,686, Data Hiding For Spot Colors in Product Packaging (Published as US Application Publication 2015-0156369);

Ser. No. 14/588,636, Full-Color Visibility Model Using CSF Which Varies Spatially With Local Luminance (Published as US Application Publication 2015-0187039);

Ser. No. 13/975,919, Geometric Enumerated Watermark Embedding for Spot Colors (Now U.S. Pat. No. 9,449,357);

62/152,745, Data Hiding Using Equal Visibility Embedding For Color Designs, and related application Ser. No. 15/137,401, entitled Full-Color Visibility Model Using CSF Which Varies Spatially With Local Luminance (Now U.S. Pat. No. 9,565,335);

Ser. No. 14/724,729, Differential Modulation For Robust Signaling And Synchronization (Now U.S. Pat. No. 9,747,656);

Ser. No. 14/725,399, Sparse Modulation For Robust Signaling And Synchronization (Now U.S. Pat. No. 9,635,378);

and Ser. No. 15/072,884, Sparse Modulation For Robust Signaling And Synchronization (Published as US Patent Application Publication US 20170024840);

which are hereby incorporated by reference.

In one approach, a marked image is first created that has a uniform embedding strength across the image. This uniform strength marked image is then compared to the original image and input to a visibility model that generates a visibility map specifying a visibility measure for embedding locations within the image. The visibility measure per embedding location is converted to a mask of scale factors per embedding location.

The visibility model system uses separate Contrast Sensitivity Functions (CSFs) for contrast variations in luminance and chrominance (red-green and blue-yellow) channels. The width, characteristics or curve of the CSF in each channel is scaled or modified depending on the luminance of the local image content. For example, for a given pixel, local luminance in a neighborhood around the pixel is evaluated to determine a local brightness value. The local brightness value is used to scale or modify a CSF curve. The neighborhood may include, e.g., 4, 8 or more pixels. In some cases, the CSF is adjusted so that more blurring occurs as the luminance of the local region decreases. The error difference between the contrast of the blurred (or unblurred) original and the blurred marked image is measured using a color difference metric, e.g., $\Delta E76$, $\Delta E94$ or $\Delta E2000$. The visibility values per embedding location form the visibility map. The values are inversely related to visibility (smaller color difference means lower visibility). Thus, the values are inverted to produce scale factors that adjust the amplitude of pixel adjustments to equalize visibility of the adjustments over the marked image.

Below, we provide excerpts from a Matlab implementation showing how to derive the scale factors from the visibility map (visMap). In addition to the following operations, the implementation also addresses divide-by-zero by zero and avoids saturation. We isolate the operations for deriving scale factors in the following to more clearly illustrate how they are obtained and applied. Here, wmC, wmM, wmY are the two dimensional vectors of adjustments to encode a watermark signal for embedding locations in each color channel. These adjustments are shaped by corresponding elements of the vector, reScale, and then added back to the unmarked image.

reScale=visMap;
reScale=1/reScale;
wmCshape=wmC.*reScale;
wmMshape=wmM.*reScale;
wmYshape=wmY.*reScale;
img(:,:,1)=wmCshape+unmarked(:,:,1);
img(:,:,2)=wmMshape+unmarked(:,:,2);
img(:,:,3)=wmYshape+unmarked(:,:,3);

The mask values (reScale) use the visibility map to scale the watermark adjustment up or down based on the prediction of the visibility: low visibility area, increase the signal; high visibility area, reduce the signal. The initial watermark adjustments are computed, for example, by generating a watermark signal with uniform signal strength across the image. These adjustments are then scaled to limit them to a visibility constraint, such as a constraint where the visibility of the adjustment is equalized across the image via the above shaping according to the visibility map. Alternatively or additionally, the visibility may be limited to a threshold, such as threshold on the color difference metric, which in turn, places a limit on the amplitude of the adjustment at the embedding locations.

More background on digital watermark encoding and decoding may be found in our US Patents and Applications, including U.S. Pat. Nos. 6,614,914 and 7,352,878, and US Patent Publications 20100150434 and 20140119593, which are hereby incorporated by reference. U.S. Pat. No. 6,614,914 provides background on watermark signal generation, including generating watermark signal blocks with variable payload and synchronization components. It also provides watermark signal encoding and decoding schemes. U.S. application Ser. No. 14/724,729 (U.S. Pat. No. 9,747,656) details various alternative data modulation and synchronization schemes for conveying digital payloads in images. 20100150434 provides instruction on digital watermarking in chrominance channels and related schemes for reducing watermark visibility.

As detailed in this patent literature, we have developed a suite of embedder tools, implemented as application programs, application plug-ins and web services, to adapt watermark signal insertion into a variety of host image types. These tools and services are available from Digimarc Corporation of Beaverton, Oreg.

Some host images have variable image content in plural color separations. Embedding in these images employs visibility modeling to adapt the watermark signal based on visibility constraints and exploit information carrying capacity and hiding capacity of color channels. Some include designs printed with one or more spot colors, which pose particular challenges in terms of controlling color matching and color error due to process color modifications (in C, M, and Y) to encode the watermark. Others have areas with little host image content (e.g., blank areas or solid patches of color), and for these, embedder tools for color matching and encoding watermarked tints or encoding sparse marks are used to insert blocks of watermarked tint or sparse signal over the host image in one or more color separations. In the description of embodiments, we elaborate on use of these various alternative methods in the VDP printing press environment.

With respect to the embodiment of FIG. 2, the embedder 10 is implemented using one of our embedder tools that applies to host images with host image content that enable insertion by positive and negative modifications of pixels in at least one color separation. In this tool, the embedder 10 derives embedding parameters that control the amplitude of the watermark signal for embedding locations where elements of the watermark signal are inserted. The watermark signal block comprises an array of signal elements. This array is typically configured as a square block, e.g., 1024 by 1024, 512 by 512, 256 by 256, 128 by 128, 64 by 64, etc. of embedding locations at a particular watermark signal resolution, e.g., 75-300 Dots per Inch (DPI). Each element is an amplitude adjustment at embedding location at this resolution.

The resolution of the watermark, in robust signaling implementations for reading by handheld scanners and mobile devices, is typically around 75-300 Dots per Inch (DPI). The resolution may be lower, to enable reading from handheld devices at greater distances, or higher for reading at closer distance and for forensic and authentication applications.

For robust signaling, each element of the watermark signal maps to an array of neighboring pixel locations in the host image. For example, in the case of applying a watermark specified at 75 DPI to a host image at 300 DPI, each watermark embedding location at 75 DPI corresponds to 4×4 block of neighboring pixels at 300 DPI. The adjustment for the watermark signal may be converted to a curved or shaped function (digitized in the digital domain) that varies corresponding to location within the array of neighboring pixel locations in the host image. For example, some implementations taper the amplitude of the watermark signal at the outer portion of an embedding location. Some implementations also shape the watermark signal so that it approximates a continuous change across boundaries of embedding locations.

The pixels of the host image may have multi-leveled values, typical pre-RIP, or may be binary bitmaps, typical of rasterized images. We sometimes referred to the watermark signal element as a "bump" which has a size in terms of the watermark resolution relative to the target image resolution (e.g., 75 DPI watermark signal at 300 DPI image is bump size 4, corresponding to host image/watermark resolution ratio, 300/75). The bump size corresponds to the size of an embedding location of a watermark signal element, in terms of pixel area and resolution of the host image. The watermark signal adjustments bump may be shaped by varying the adjustments over corresponding pixels of the host embedding location. The adjustments may vary in value in multi-level per pixel format (e.g., typically the pre-RIP color separations) or may vary in the configuration of elementary print structure post RIP. In the latter, the halftone dot pattern may be altered (e.g., by adding, removing, growing, shrinking and/or changing position of dots (e.g., halftone dot clusters or screens). Also, line screen structures may be altered to encode a bump by increasing or decreasing the line structure corresponding to ink application at the embedding location.

An embedder 10 operates on this host image to encode a reference digital watermark signal (DWM) in it. The reference digital watermark serves as a proxy for the final, unique watermark inserted in the printed piece. Using this reference digital watermark, the embedder 10 produces a marked base image and embedding parameters. In the method of FIG. 2, the embedder 10 encodes a fixed component of the final watermark in the host image to form the marked base image. The embedding parameters are used later to control the amplitude of variable watermark signal elements. These variable watermark signal elements are the modifications used to encode unique payloads in each printed piece.

In an alternative embodiment, the embedder uses the reference watermark only to determine embedding parameters at this stage. The host image is left un-marked. As in the above embodiment, these embedding parameters are used to compute a variable component. The variable component may be a combination of a fixed watermark component and variable payload component, or only a variable payload component. In some protocols, the watermark signal consists of a variable payload component arranged to facilitate synchronization, and as such, there is no significant "fixed" component. See, for example, U.S. application Ser. No. 14/724,729, which is incorporated by reference above.

As noted, the reference digital watermark is preferably formed to act as a proxy for the final watermark. Since the final watermark is dependent on a unique payload of each printed piece, it is not practical, nor necessary, to derive embedding parameters adapted for each final watermark. Instead, the embedding parameters are approximated using a reference watermark. The embedding parameters are a function of visibility and robustness metrics that govern the strength of the watermark signal at each embedding location within a host image. The embedder 10 applies different weights to robustness and visibility constraints, as set by the designer and/or derived automatically from analysis of the host image and reference digital watermark. The embedding parameters output from the embedder 10 specify constraints on the strength of the watermark per embedding location. This may be specified in the form of a scale factor and/or limits for signal amplitude in adjustment directions per embedding location.

There are several options for constructing the reference watermark. In one option, the reference watermark is a fixed component, which is common to all printed pieces. This fixed component, in one implementation, is a synchronization signal. The fixed component may also include a static payload, encoded at a different spatial resolution than the variable payload. For example, the fixed payload may be a public watermark, carrying a product identifier, such as a GTIN, at a different spatial resolution than a private, variable payload.

Examples of synchronization signals are described in U.S. Pat. No. 6,614,914. As an alternative proxy for a final payload dependent watermark, the reference signal may be comprised of a synchronization signal and a random payload signal, which is generally representative of other payload signals. In watermark protocols where synchronization is inherent in the arrangement of the variable payload elements, the reference watermark may be a representative watermark signal generated from a chosen payload. For more information, our application Ser. No. 14/724,729, entitled Differential Modulation for Robust Signaling and Synchronization, describes several signal structures with inherent synchronization.

Other forms of synchronization may also be employed within the encoding and decoding systems. For example, visible registration structures may be incorporated onto the package design, such as the fiducials typically employed in 2D barcode symbols like QR codes, circles or box-like line structures that form visible templates for geometric registration. Another example is to employ the orientation derived from the line screen angle as a synchronization signal.

Additional synchronization approaches may be applied that also do not require synchronization signal components or structure within the watermark signal. One strategy is to employ a search for synchronization by applying watermark extraction and payload checking operation repeatedly over an area of a signal suspected of containing a payload, each time with different synchronization parameters. Our application Ser. No. 14/724,729 describes an approach that applies filter kernels at different rotation and scale states, for example. Another strategy is to use feature recognition to approximate geometric or temporal distortion prior to payload extraction. See, for example, our US Application Publication 20140119593, and our U.S. Pat. No. 8,300,884, which are hereby incorporated by reference.

Other design elements, including even VDP templates with personalized information, may be used as fiducials for geometric registration. Particular examples include personalized text and graphics, which when printed, form geometric reference markings for synchronization. The placement of text, and its alignment in rows and columns provides one form of fiducial for registration. Boxes containing variable images also have edge structure that forms a frame of reference for embedding locations for the payload. The start of a recipient's name, for example, can be used to indicate the origin of a watermark signal block, and the text itself may provide clues on how to decode the watermark signal. For example, the text may be machine read (via OCR) and hashed into a binary sequence, which is used as a cryptographic key for decoding the payload, or a key for the generation of a carrier signal (such as a pseudorandom sequence) used to modulate the payload. The text or graphics may also be transformed (e.g., via hash) into an offset value, indicating relative position of the origin of a watermark signal relative to a particular point within the image.

Returning to FIG. 2, the next stage is to compute adjustments for converting the marked base image into final marked images, each with a unique payload. Each unique payload is encoded into the host image by making a particular set of positive or negative adjustments at embedding location within each tile of the host image, where the base mark resides. Every desired payload for this particular host image, therefore, is a subset of all allowable positive and negative adjustments adapted to the host image. This stage of the method employs the embedding parameters to derive the allowable positive and negative adjustments for the host image.

There are a variety of implementation configurations for this stage. In one approach, the adjustments are generated to be applied to a pre-rasterized version of the marked base image. In this case, the adjustments for a particular payload are applied to pre-rasterized image pixels, and then a RIP converts these pixels to rasterized form for merging into a final rasterized image during operation of the press. This approach may not be appropriate as it may require too much computation during operation of the press.

In a variant of this approach, an optimized RIP is adapted to receive the adjustment quantities and locations for a particular payload and make the adjustments to the marked base image pixels within the DFE or press during press operation. This RIP is an optimized version of the RIP used in the DFE or press, which employs a Graphic Processing Unit (GPU) or like image processing logic to make positive or negative adjustments according to the corresponding strength value specified from the embedding parameter for an embedding location. Preferably, a GPU implementation executes parallel and/or vector operations on the base image at plural embedding locations where an adjustment is needed to encode the unique payload of a printed piece, applying the positive or negative adjustment with strength set by a scale factor. Of course, where no modification is allowed or needed, there is no adjustment (e.g., the scale factor is zero). This limits the number of image modifications needed to serialize each printed piece, as only embedding locations with allowable adjustments for a given payload are modified.

GPUs enable efficient transformation of groups of pixels to make additional adjustments that encode variable payload information. Examples include:

Deforming a group of pixels, relative to a registration marker, e.g., stretching or shrinking along an axis to encode variable bits unique to the image;

Making localized deformations, to make different changes across the image;

Overwriting portions of the image with un-marked content to communicate variable data (e.g., with no reference signal);

Where the watermark signal is in a particular color separation (e.g., applied by an extra plate or in the yellow channel for an image that does not otherwise need that channel), chunks of pixels in that channel are flipped, rotated or otherwise altered to carry variable data unique to the image.

All of the above GPU operations can be performed using GPU compute units with very little computational cost. Examples of GPU units that may be used to make adjustments include Pixel Shaders, Vertex Shaders and Texture Mapping Units, to name a few. These types of compute units may be employed to make adjustments to accelerate the generation of a final, uniquely marked image, in memory of the DFE or press, during a print job.

In another approach, depicted in FIG. 2, the method converts adjustments into a rasterized pixel form prior to running the print job. This pre-processing approach enables either a RIP or the press to write these pixels into the final rasterized image efficiently during operation of the press, as the rasterized pixels are simply selected from a database for a particular payload and written into embedding locations of the rasterized base image.

FIG. 2 illustrates a configuration for generating the rasterized form of the adjustments. Raster Image Processor (RIP) 12 is a rasterizer that operates in pre-processing mode, prior to the printing of unique pieces. Its role is to generate a rasterized version of the base image (Post RIP image) from which module 14 determines a rasterized form of the adjustments. We illustrate examples of adjustments in FIGS. 3A-D, discussed below.

Module 14 computes the set of all allowable positive and negative adjustments for a desired set of unique payloads. It obtains the embedding parameters that specify the allowable adjustment range that can be made for each embedding location. It then determines the allowable positive and negative adjustment for each embedding location within the allowable range for the corresponding embedding location. In some cases, no adjustment or only a positive or only a negative adjustment may be allowable. One cause for this is that the embedding parameter specifies that no change can be made, or only a negative or only a positive change is allowed, but not both. The pixels of the base image at the embedding location may already be at one end of the dynamic range or the other, such that there is no more headroom to make an adjustment that would exceed the dynamic range. Relatedly, the pixels at an embedding location may already contain a reference signal adjustment that is consistent with the positive or negative adjustment for the payload, and as such, no further adjustment need or can be made for generating an image patch carrying the unique payload at the embedding location. Another way of expressing this concept is that the base image may either:

1. Have a configuration of pixels that already yields the desired effect of the positive or negative adjustment;

2. Or be so limited that the positive or negative adjustment, if it were attempted, would not result in the desired effect of the positive or negative adjustment, and as such, is a lost cause. The inability to make an adjustment at some embedding locations may contribute minor error to the decoding of the unique payload, but this error will have little effect due to redundancy of the encoding across embedding locations.

To accommodate this approach, module 16 generates a database of allowable adjustments that are accessed at press time to rapidly update a rasterized base image into a final rasterized image. The database is unique to the particular host image, and it contains allowable positive and negative adjustments per embedding location for that host image. This includes the adjustments for each color separation which is altered to encode the unique payload. The database may be loaded into RAM, persistent memory unit, buffer or register in the DFE or press, in the form of a look up table, for rapid generation of a mask or template as each unique image is being imaged for variable marking during press operation.

Another optimization strategy is to pick payloads (symbols) that are minimally distant from each other, minimizing the number of pixels that need to be changed. Doing so may be achieved by a gradient descent algorithm to find the global minimum among two axes (minimal pixel changes and minimally acceptable symbol distance being the two axes). While this is a more computationally complex task, it is executed in a pre-processing stage to formulate sets of unique payloads prior to applying them to a host image. It need only be run once, in a pre-processing stage prior to the print job.

Figure 3A:
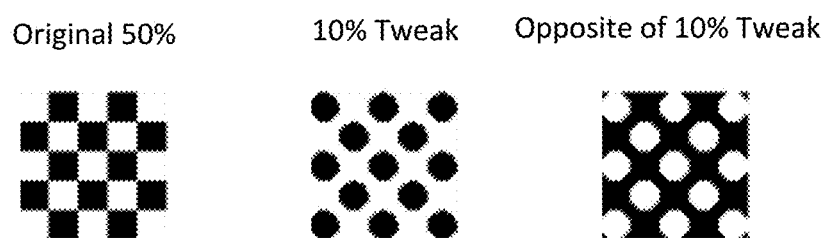
FIG. 3A shows an example of pixels at an embedding location in an image with positive and negative adjustments. The leftmost image is the original pixel array corresponding to an embedding location with 50% ink coverage (e.g., 50% screen). The middle and right images illustrate 10% adjustments in two directions, changing ink coverage to 40% and 60% coverage, respectively.

FIG. 3A shows an example of pixels at an embedding location with positive and negative adjustments. The left group of pixels is an example of the rasterized form of pixels in the original, base image within an embedding location. In all three pixel groups, the black areas represent application of ink in a color separation, whereas white areas represent no ink. The middle group of pixels is an adjustment with approximately 10% less ink (a 10% tweak). The right group has the opposite adjustment. The amount of the adjustment is specified by the embedding parameter for the embedding location. As noted, this may be a scale factor (e.g., +/−10% in this case). The positive and negative adjustments need not equal each other. This may be specified by setting particular scale factors for each direction of pixel adjustment, or using a combination of scale factor and thresholding or clipping to keep the adjustment within maximum and minimum tweak parameters.

Figure 3B:
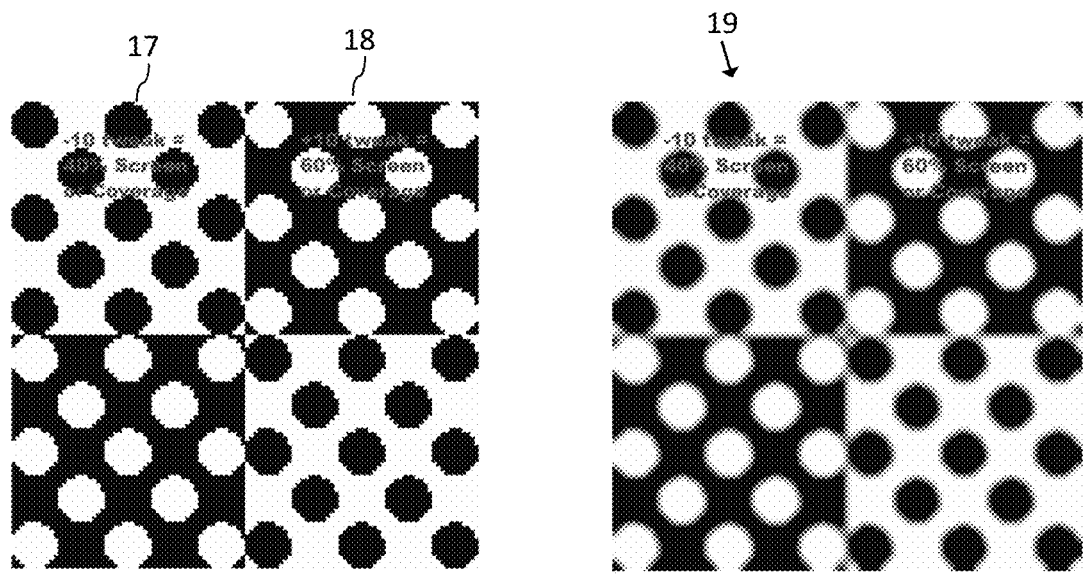
FIG. 3B shows an example of a 2 by 2 array of embedding locations, which are adjusted 10% relative to an original 50% ink coverage.

FIG. 3B shows an example of a 2 by 2 array of embedding locations, which are adjusted 10% relative to an original 50% ink coverage of a host image area. These are the same adjustments as shown in FIG. 3A, but shown as a 2 by 2 group of bumps. The left image approximates pixel areas with bump adjustments. Upper left and lower right regions have ink coverage reduced, whereas upper right and lower left have ink coverage increased 10% relative to the 50% original host image. Specifically, pixel area 17 shows an embedding location with 10% reduction, whereas pixel area 18 has a 10% increase in coverage. The right side of FIG. 3B approximates the image patch after printing.

Figure 3C:
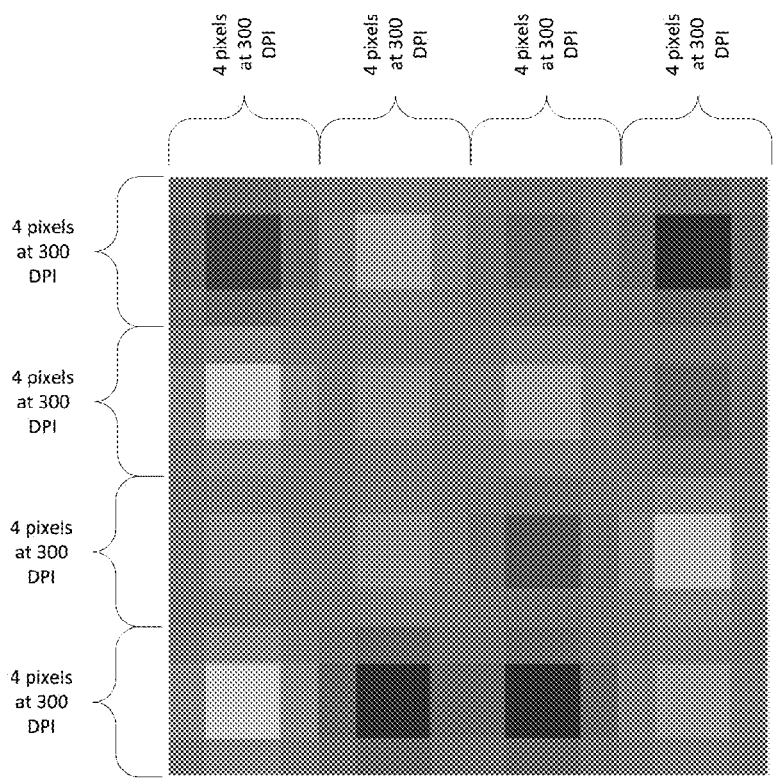
FIG. 3C shows an example of a 4 by 4 array of embedding locations. In particular, this example illustrates a 16 pixel by 16 pixel array within a 300 DPI image, where the watermark signal is at 75 DPI. Each embedding location within the 4 by 4 array of embedding locations, is a 4 by 4 array of pixels at 300 DPI.

FIG. 3C shows an example of a patch of pixels at a 4 by 4 array of embedding locations. In particular, this example illustrates a 16 pixel by 16 pixel array within a 300 DPI image, where the watermark signal is at 75 DPI. Each embedding location, within the 4 by 4 array of embedding locations, is a 4 by 4 array of pixels at 300 DPI (see 4 by 4 groups marked by brackets). The variable payload is encoded by making positive or negative adjustments at the embedding locations.

Figure 3D:
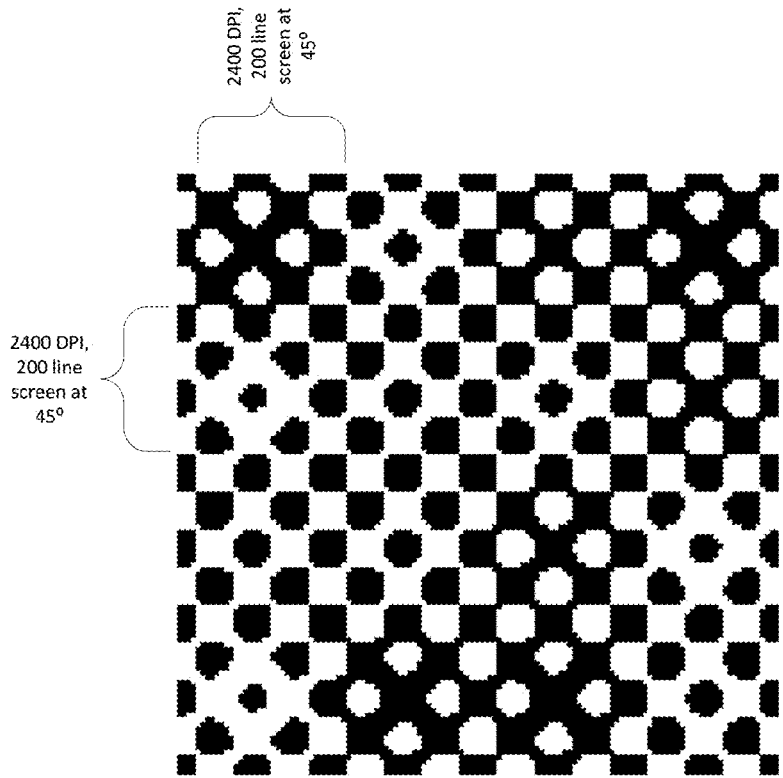
FIG. 3D is a resampling of the image of FIG. 3C at 2400 DPI, using a 200 line screen at 45°.

FIG. 3D is a resampling of the image of FIG. 3C at 2400 DPI, using a 200 line screen at 45°. This shows an example of how set of adjusted pixels are presented in rasterized form. These types of positively and negatively adjusted pixels are generated and stored per embedding location. They are selected for insertion depending on the unique payload.

The selection of adjusted pixels is not known until the unique payload is generated. Once it is generated, the method selects the adjusted pixels needed to encode that unique payload.

Figure 4:
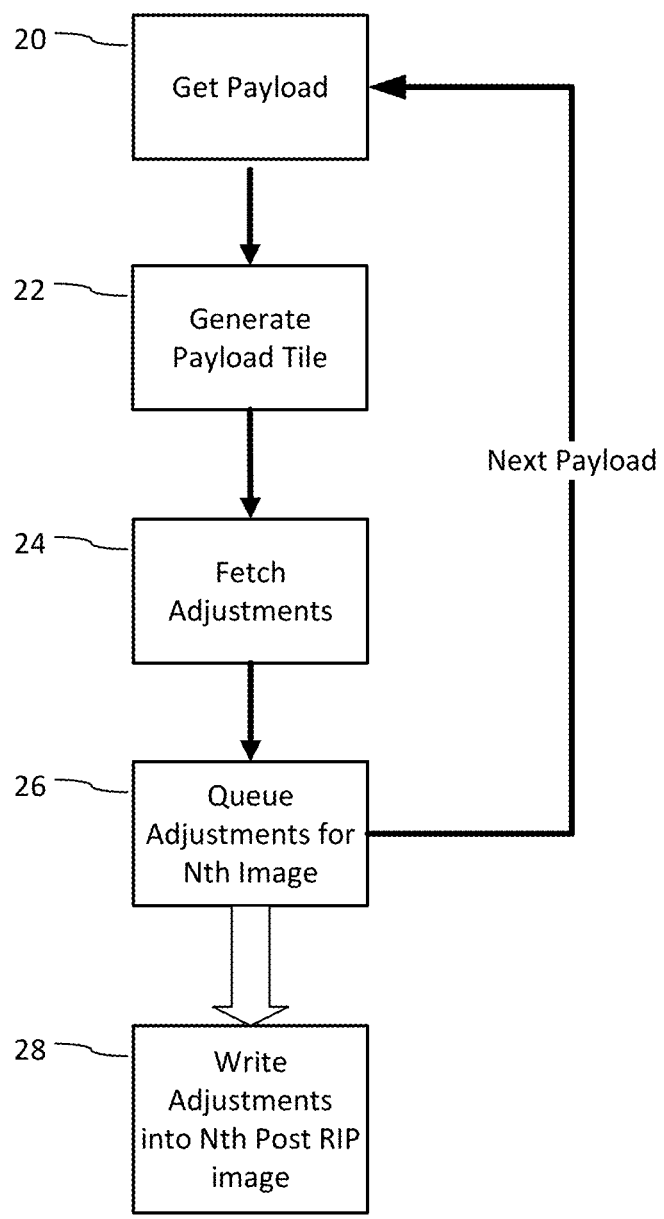
FIG. 4 is a diagram illustrating a method for generating a unique digital payload per printed piece and adjustments to embed it efficiently in a VDP environment.

FIG. 4 is a diagram illustrating generation of unique payloads and the corresponding adjustments for encoding them. For the sake of illustration, consider an application in which a set of unique serial numbers is allocated to a print job, in which each printed piece will be redundantly encoded with one unique serial number. In block 20, the process gets a serial number and supplies it to a payload generation process 22. The payload generation process 22 generates the set of positive or negative values for a watermark signal tile. Methods for doing so are described in above referenced patent literature (e.g., append CRC, error correction encode, repeat, modulate onto carrier signal such as a pseudorandom sequence, map modulated carrier signal elements to embedding locations within tile). This process may be executed in advance of the print job, or at least a portion of it may be done in advance, with the payload tiles cached and queued for use in selecting the adjustments needed for a particular printed piece. Since the payload tile is redundantly encoded in a printed piece, there need only be one tile for each printed piece.

The payload tile is mapped to tile locations within the host image. Tiles are arranged in contiguous fashion in the horizontal and vertical directions for each color separation of the image in which the watermark signal is to be encoded. While the payload is the same in the tiles, the adjustments are image and color separation dependent. Thus, when the adjustments are fetched from the database as shown in block 24, they are obtained for embedding locations in the coordinate space of the target image. At this stage, as in the payload generation process, the sets of adjustments corresponding to a subset of serial numbers is generated, cached in local memory of the DFE or press, and queued for writing into the final rasterized image prior to the print job. Various caching strategies may be employed, depending on design and capabilities of the DFE and press, to generate and cache, a mask for each unique payload, which contains adjustments or substitute pixels some number of print cycles in advance of printing a piece with that unique payload.

Block 28 depicts that the process writes the adjustments into the Nth corresponding post RIP image. The number, N, refers to the number of the final rasterized image, which is generated by applying the Nth adjustment mask or template to the base image to create the uniquely marked image that the press applies to the Nth printed piece. Referring to FIG. 1, this processing block may be implemented within the RIP 5 of the DFE 2 as a step in generating the final rasterized image, which is then supplied to the press. This may be implemented using VDP standards, where the PDL print file specifies that the template corresponding to the Nth adjustment set be combined into the static base image.

Alternatively, where the press has image compositing capability, the press combines the adjustments with the base image. See, e.g., US Patent Application Publication 20070253027, relating to on-press merging, which is incorporated by reference. In this type of press, the press has a processing unit that combines static templates stored in its memory with rasterized components from the DFE for VDP. For our application, the press 4 obtains the template of adjustments from the DFE, and it stores the rasterized base image as a static template. Within the press, the processing unit 6 writes the adjustments into memory to combine the pre-rasterized base image with the adjustments.

Figure 5:
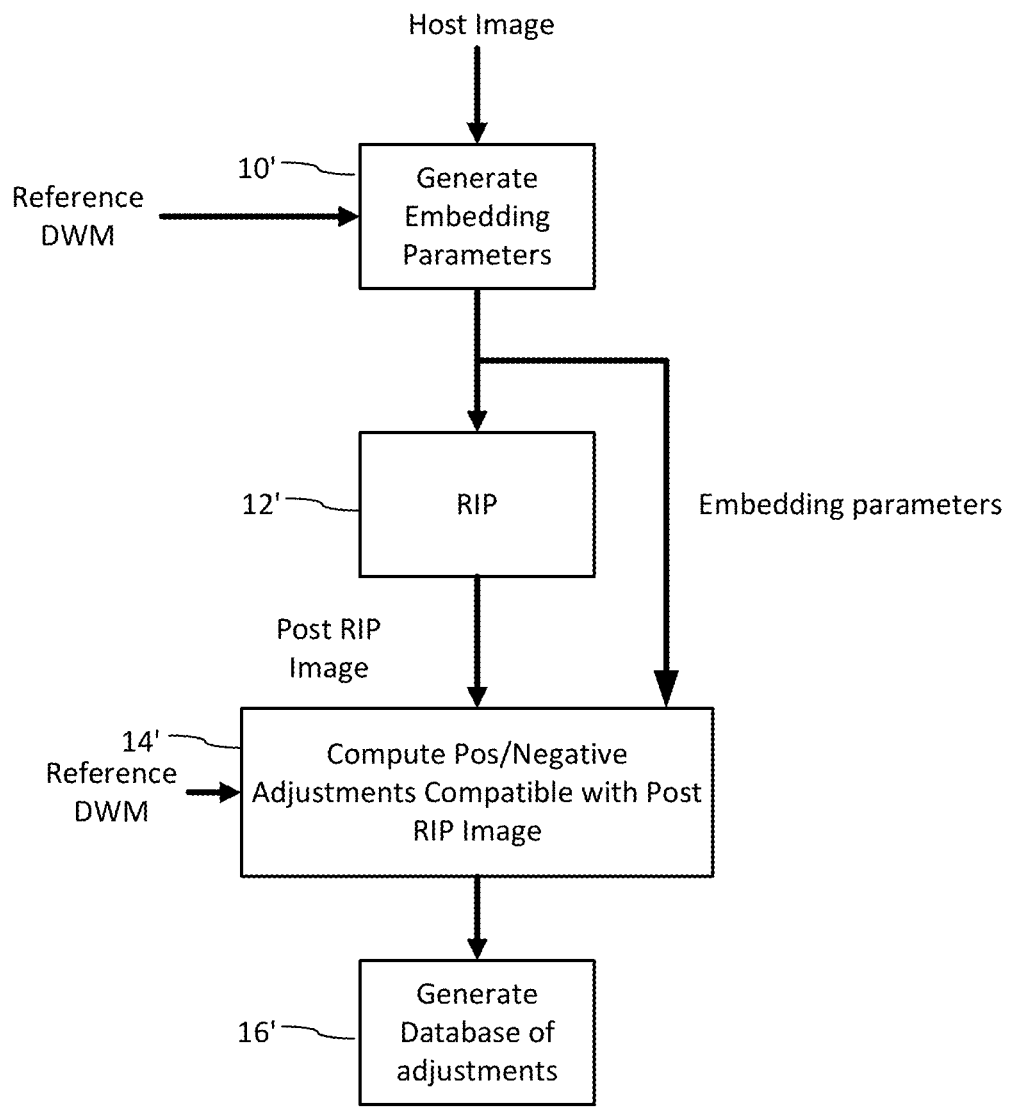
FIG. 5 is a diagram depicting a variant of FIG. 2.

FIG. 5 is a diagram depicting a variant of FIG. 2. Similar processing modules are labeled with the prime symbol, ', to illustrate that these are the counterparts to processing modules in FIG. 2, described above. The primary difference in this approach is that the embedding tool 10' does not embed the reference signal into the host image, but instead, computes the embedding parameters and defers modification of the host image.

The RIP 12' converts the host image into a rasterized form. The objective for computing the rasterized form is to facilitate generation of positive and negative adjustments in terms of rasterized pixels (e.g., like those in FIG. 3D). In particular, processing module 14' determines the positive and negative adjustments by taking rasterized pixels as input and altering the screen structure of the rasterized pixels at an embedding location to generate a net positive and negative adjustment for that location. The difference of processing module 14' relative to processing module 14 of FIG. 2 is that the positive and negative adjustments are a function of the input pixels of the host image, the reference DWM element and the positive and negative adjustment for variable payload encoding at the embedding location. The benefit of this approach is that the relationship between the adjustment to embed the reference DWM signal and the positive and negative payload adjustments are considered to compute a net adjustment. Depending on visibility and robustness constraints, the module can weight each component differently, and can also compute a net adjustment based on whether reference signal is in the same direction as the positive or negative payload adjustment.

An alternative approach is to re-order the processing so that these adjustments are determined based on host image pixels prior to rasterizing them. In this approach, a variant of module 14' computes the allowable net positive and negative adjustments due to reference signal and payload at each embedding location. It then makes the allowed adjustment for both the positive and negative payload, taking into account reference signal effect. This adjustment changes the value of multi-valued pixel elements in each color separation where the watermark is to be applied (e.g., like the pixels of FIG. 3C). The pixels are then rasterized to generate a rasterized form of the host image pixels, including a version containing a positive adjustment for each embedding location and a version containing a negative adjustment for each location, where adjustments are allowed and exist (e.g., like the pixels of FIG. 3D).

Module 16' operates similarly to module 16 of FIG. 2, described above. As noted, an alternative to post-rasterized adjustment is to generate a database adjustments to be applied to pre-rasterized pixels. In this approach, the RIP or press retrieves the adjustments for a particular unique payload from the database and applies them to the pre-rasterized host image at embedding locations to create a marked host image.

In one mode of operation, each uniquely marked host image is rasterized in full during operation of the press and supplied to the press for printing. This approach may tend to slow down the press, and as such, may not be suitable for larger run print jobs.

In another mode, the portions of the marked host image at the embedding locations that are adjusted are rasterized during operation of the press, and are merged with a rasterized version of the host image to produce a uniquely marked final image for printing.

In particular, in one embodiment, rasterized versions of positively and negatively adjusted pixels are sent to the press for embedding locations where the unique payload for a printed instance is encoded. The positively adjusted pixels have allowable positive adjustments made to them (according to visibility and robustness metrics and adapted for synchronization signal contribution) and correspond to embedding locations across the host image of the unique payload. These embedding locations correspond to the locations within payload tiles that are mapped to host image locations. The negatively adjusted pixels have allowable negative adjustments made to them and correspond to the embedding locations across the host image of the unique payload. The positively and negatively adjusted pixels may be mapped to pixel locations of one or more color separations of the host image.

These rasterized versions of positively and negatively adjusted pixels provide a database of allowable adjustments from which positive or negatively adjusted pixels are selected depending on the unique payload to be encoded in real time as the press prints each unique piece. This database is static in the sense that it is pre-generated and loaded once into the memory of the press in rasterized form prior to printing a unique piece.

During real time operation, the DFE sends a payload tile into the press, which is used to select positive or negatively adjusted pixels from the database according to the unique payload values in the tile. The payload tile is replicated across the image, e.g., in contiguously arranged blocks of tiles in horizontal and vertical directions. The adjustments to encode the payload within each of these contiguous tiles vary depending on the corresponding value at the coordinates of the embedding location in the database. If an embedding location in the host image has a logical 1 (positive 1) at the corresponding location in the payload tile, the positively adjusted pixel is selected for writing to the final marked image in memory of the press. Conversely, if an embedding location in the host image has a logical zero (negative 1) at the corresponding location in the payload tile, the negatively adjusted pixel is selected for writing to the final marked image in memory of the press.

In one embodiment, the positively and negatively adjusted pixels are subdivided into separate rasterized image arrays and selected by the processor in the press according to an alpha blend channel. A first image array comprises positively adjusted pixels, and a second image array comprises negatively adjusted pixels. The alpha blend channel comprises one or more payload tiles that have been mapped into an array of contiguous blocks of pixels in the host image. The values within the payload tiles control selection of a positively or negatively adjusted pixel at an embedding location from the first or second image arrays, respectively. In this approach, the DFE transfers the payload tile for a unique payload to the press via the alpha blend channel.

The DFE may construct the alpha blend channel as a single payload tile for a unique printed instance and issue an instruction to the press to replicate the tile across the host image. In this case, the processor in the press replicates the payload tile in contiguous blocks to map the tiles to host image embedding locations. It may replicate the tile or a set of tiles in a step and repeat fashion to cover the host image with tiles. The processor then traverses the embedding locations within the tiles, reads the payload values at the locations, fetches the selected positively adjusted or negatively adjusted pixel from the first and second arrays, and writes the selected pixel to the corresponding location within the rasterized host image.

The DFE may construct the alpha blend channel by replicating the payload tile in contiguous pixel blocks mapped to host image pixel locations. In this case, the DFE sends the alpha blend channel in a state that is ready to be read by the processor of the press to select positively or negatively adjusted pixels from the first and second image arrays, respectively.

The above approaches can be extended and adapted in various ways. In one approach, the DFE transfers a rasterized version of a marked host image to the memory of the press. This rasterized version comprises a base marked image, which includes a synchronization signal and fixed payload (variable information but fixed for printed instances of the host image). The fixed payload is mapped to a first set of embedding locations within a payload tile. During operation of the press, the press receives payload tiles for a variable payload, mapped to a second set of embedding locations within a payload tile. The press writes in the adjusted pixels according to the payload tile into the rasterized version of the base marked image to convert it to a final marked image having the synchronization signal, and both a fixed payload and variable payload elements. The variable payload makes it unique. The adjustments incorporate visibility and robustness constraints, as well as contributions of the synchronization signal at the embedding location of the variable payload.

In an application for package designs, for example, the base marked image includes a fixed payload that carries an identifier common to all printed instances of the package design image, such as a GTIN. The fixed payload is error correction encoded to form encoded bits, modulated with a pseudorandom carrier sequence, and the modulated bits are mapped to embedding locations. These modulated bits are encoded by positively or negatively adjusting corresponding pixels at the embedding locations based on the value of the modulated bit (1 for positive adjustment, and 0 or −1 for negative adjustment) Likewise, positive and negative adjustments are computed in a similar fashion for the locations of the variable payload, but the selection of the variable payload, and thus, the set of positive/negative adjusted pixels, is executed during press operation to create a unique instance. The positive and negative adjustments of the fixed and variable payload have been adapted based on adjustments to encode the synchronization signal.

Further, a visibility map computed from the host image is used to generate scale factors to scale the positive and negative adjustments for all embedding locations of the host image. These scaling modifications are applied in advance to set amplitude of the pixel adjustments in the positively and negatively adjusted pixels.

While the above example refers to positive and negative adjustments, the adjustments may be employed in various ways to implement various signaling and encoding schemes. In one encoding scheme, the adjustments are quantized into levels, and the levels correspond to different message symbols, e.g., M-ary symbols. The values in the payload tile select the quantization level, which in turn, corresponds to a pre-computed adjustment.

The adjustments may be applied to pixel value amplitude in one or more color separations. In some cases an adjustment in one color separation is offset with a compensating opposite adjustment or series of adjustments in other color separations to reduce visibility and/or increase robustness. The payload tile, thus may be configured to select from among more than just a positive or negative adjustment. Instead, it may select from among plural levels of adjustment, in plural color separations.

Further, the adjustments may be mapped to groups or clusters of neighboring pixels to apply a pattern of adjustments that corresponds to a variable payload element.

As noted, only a subset of the pixels of the rasterized image in memory of the press need be modified to make the final marked image unique. This reduces the amount of data transferred from the DFE to the press to specify a portion of the payload that makes a printed instance unique. It also reduces the computation within the press to selection and writing of just the adjusted pixels needed for each unique printed instance.

In some embodiments, the adjustments to make a marked image unique may be confined to one color separation. For instance, the static, base marked image may be comprised of C, M, Y, and K color separations (the process colors), and possibly other color separations (e.g., spot colors). Adjustments to serialize a printed instance may be confined to the black channel (K). This approach, however, may have greater impact on visual quality, as the adjustments in this black channel may tend to be more visible. The efficiency of single channel adjustments for the variable payload can be achieved with less visibility by placing at least partially offsetting adjustments in one or more other channels using a static reference watermark signal in those channels, such as an offsetting reference signal that at least partially offsets the synchronization signal component. In this scheme, offsetting adjustments are pre-embedded in the static, rasterized base image to pre-compensate for the later adjustments to be made for the variable payload that make a printed instance unique.

The above examples are based on an application in which the host image has variable image content. Specifically, the host image has plural color separations, and the pixels within each vary over a spatial area. In such cases, the embedding parameters are generated as a function of color, visibility and robustness metrics that vary with this variable host image content. See, for example, Ser. No. 14/588,636, Full-Color Visibility Model Using CSF Which Varies Spatially With Local Luminance (Now U.S. Pat. No. 9,401,001); Ser. No. 13/975,919, Geometric Enumerated Watermark Embedding for Spot Colors (U.S. Pat. No. 9,449,357); 62/152,745, Data Hiding Using Equal Visibility Embedding For Color Designs, Ser. No. 15/137,401, Full-Color Visibility Model Using CSF Which Varies Spatially With Local Luminance (U.S. Pat. No. 9,565,335); U.S. Pat. Nos. 6,614,914, 7,352,878 and US Patent Application Publication 2010-0150434.

Not all images require sophisticated optimization of embedding parameters. For these images, the generation of embedding parameters is simplified.

Some images include uniform tones of a particular color. That color may correspond to a particular spot color. See, e.g., Ser. No. 14/616,686, Data Hiding For Spot Colors In Product Packaging Now U.S. Pat. No. 9,380,186). The unique payload signal may be conveyed by adding a tint carrying the unique payload to the host image. In the case of spot color areas, one strategy of the embedder tool is to match the spot color with a process color tint. This strategy can introduce a color match error, due to the color difference in process color tint and spot color, as well as a watermarks signal error. In this case, the embedding parameters control the adjustment to encode a watermark signal at an embedding location that is determined based on minimizing the color match and watermark error. As described in Ser. No. 14/616,686, different weights may be applied to color match and watermark error.

For a VDP workflow, variations of the approaches of FIG. 2 or 5 generate rasterized versions of uniquely marked tints and store them in a database. For a print job, each uniquely marked tint is converted to a template or mask and queued for combination with the host image. During the print job, the RIP or press combines the uniquely marked tint for a printed piece with the host image to form a final rasterized image for printing.

Some images are either devoid of image content or are otherwise not able to be modified by other methods. In this case, the embedder tool encodes a digital payload using sparse marking strategies. See, e.g., our U.S. application Ser. Nos. 14/725,399 (U.S. Pat. No. 9,635,378), and Ser. No. 15/072,884 (US Patent Application Publication US 20170024840), both entitled Sparse Modulation for Robust Signaling and Synchronization. This type of marking differs from the others in that the signal is arranged as sparse elements on a background that is lighter (e.g., sparse dots on a blank substrate), or darker (e.g., sparse holes in a dark background or substrate). The position of the sparse elements (dots or holes) varies with each unique payload. In particular, there is a unique signal tile, carrying a unique payload, which is assigned to each unique printed piece.

In the case of sparse signaling for VDP, the unique signal tiles of sparse signal are generated and merged with the rasterized host image. Each unique tile may be generated in advance of the print job and then applied to a host image in a color separation by the RIP or press during the print job. For example, one approach in our U.S. application Ser. No. 14/725,399 generates a sparse signal tile by combining a sparse image of a binary reference signal (synchronization component) with a sparse image of a variable payload signal with a logical AND operation.

For use in a VDP workflow, one approach is to create a template or mask for each unique payload. The template or mask is a layer formed by repeating a sparse signal tile contiguously in horizontal and vertical directions to fit the host image size.

For a print job, some number of uniquely marked, rasterized images are created and queued in advance of the print job by combining these templates or masks with the host image. This process of creating uniquely marked images continues during the print job so that the next uniquely marked image is always ready to be read from memory in the press and supplied to the imager.

Applications of Serialized Printed Items

The capability to encode a unique payload throughout each printed object in a commercial printing environment enables a myriad of applications. One application space is serialization of product packaging. This is useful for track and trace applications, where each object is tracked through distribution. A related application is counterfeit detection. The status of an authentic objects is tracked through distribution by updating a database record linked to its unique payload with status information at points along its distribution. If a fake object is found, it either will not have a readable payload, or the payload will link to the database record of the authentic object, and the contextual information for the fake object (its location or buyer) will not match the distribution history of the authentic object. Networked mobile readers may be deployed to decode the ID, connect to the database and check the contextual information against the distribution history to determine whether the contextual information is consistent with the distribution history.

The ability to encode unique payloads efficiently in commercial printing of products and product packaging provides a practical and cost-effective framework for implementing a variety of authentication schemes. One authentication scheme is to capture an image of a printed object, calculate a hash of a feature unique to the object, and enroll that hash in a database, indexed by a unique payload embedded in the object. If the hash is known apart from printing of the object, e.g., from something applied to the object like a RF tag, hologram, substrate fingerprint, etc., it may be carried in the payload generated for and embedded in a printed image on the object or its packaging. The feature is unique to the object either because of printing or paper artifacts, or because of optical properties of some Optically Variable Device like hologram attached to the object. To authenticate the object, a hash is extracted from image captured of the object (e.g., smartphone or other image capture device). This hash is then compared with one fetched from the database using the unique payload extracted from an image of a suspect object, or one conveyed in the watermark payload of that suspect object. The above VDP methodologies are particularly suited for either embedding an encrypted hash in a variable payload within each printed piece, or embedding a variable payload that is indexed to the database entry storing the encrypted hash.

In summary, this authentication methodology includes a process of either:

Storing the hash in a database and looking it up using the unique payload at the time of verification;

Embedding some encrypted version of the hash into a watermark or other machine readable symbology printed on the object.

One class of hashes include visual hashes of material micro-structure, where the unique reaction of paper and ink or structure of the paper/substrate itself is hashed. Hashes could be based on random projections of lines, as described in Voloshynovskiy, S.; Diephuis, M.; Beekhof, F.; Koval, O.; Keel, B., "Towards reproducible results in authentication based on physical non-cloneable functions: The forensic authentication microstructure optical set (FAMOS)," 2012 IEEE International Workshop on Information Forensics and Security (WIFS), pp. 43-48, 2-5 Dec. 2012, which is hereby incorporated by reference.

Another class of unique features are high resolution barcode-like patterns that are hard to photocopy like the ones in US20080301767, which is hereby incorporated by reference. See, also, Anh Thu Phan Ho, Bao An Hoang Mai, Wadih Sawaya, Patrick Bas. Document Authentication Using Graphical Codes: Reliable Performance Analysis and Channel Optimization. EURASIP Journal on Information Security, Hindawi, 2014, pp. 10.1186/1687-417X-2014-9, which is incorporated by reference. To employ this approach, the unique payload is used to provide cryptographic key needed to generate a pattern. This pattern is then used for correlation to authenticate the object. The unique payload provides the key either by carrying it, or carrying an index to it in a database.

Another application is for serializing shipping containers for improved logistics. Traditional barcodes are used extensively in distribution and shipping of objects. However, as noted, they are limited to a particular location on the object, making them more difficult to read (blocked from sensor view), susceptible to damage or loss, and unreliable. The above signal encoding replicates a unique identifier across an object's surface (e.g., in tiles of about 1 square inch). This signal encoding is used to pre-serialize an object when it is printed in the workflow of a commercial press. This pre-serialization avoids the need to add labels later, saving time and cost added by the infrastructure needed to support printing of labels and data management of the information carried in barcodes on the label. It also is compatible with schemes in which labels are added because the label only obscures a portion of the surface, leaving plenty of encoded signal in other areas of the surface from which to extract the payload.

In addition to the above benefits, the inclusion of the payload in the container also enables it to be employed within distribution centers for material handling, tracking, related applications, without the need for yet further traditional barcodes. Replicating the signal on the container enables it to be read from many different positions by machine vision and other camera based auto-ID equipment in the distribution center. This provides savings in auto ID equipment because it achieves greater reliability and speed for less equipment and handling cost. It lowers equipment cost as the machine vision system can reduce the number of cameras per read station. Typically, the read station employs several cameras to ensure each package is read as it moves on a material handling system, such as a conveyor. It also reduces the need for putting traditional barcodes on multiple sides of the container.

The logistics use case begins with the creation of serialized containers. Using above described technologies, a commercial printing system inserts a unique payload in each container as it is printed. One approach is to encode a tracking number in the payload. Another is to encode a unique number to which a tracking number is later assigned within the database of the shipper. The latter approach enables the payload to be associated with multiple tracking numbers over time. The history of each shipment may be associated with the payload of the container. For any particular shipment, only one tracking number is associated with the payload at a time.

The above encoding methods enable the payload to be applied using various strategies, each tailored to the application and package design, creation method, and material (e.g., cardboard, plastic, etc.). They work equally well on rigid containers made of cardboard or other paper based material, as well as rigid and flexible containers made of plastics, including flexible pouches or envelopes.

The encoding strategy is preferably adapted for the design and image content. Even within a given package, multiple strategies are employed to handle variable graphics, uniform tones and spot colors, and blank areas. Sophisticated package designs with variable graphics and images employ encoding that leverages visibility and robustness analysis to pre-determine the embedding parameters. Process color tints or sparse marks are useful for parts of a package design with uniform tones, including uniform tones printed with spot colors, or blank areas. One example of a process color tint is a tint comprised of 4% C, 2% M, 2% Y, which is suitable for near white or blank areas. Another example of a process color tint is one that is used to approximate spot colors. A spot color area in a design file may be screened back and combined with a process color tint, such that the area matches the original color prior to screening back the spot color. The spot color area may also be approximated with a different spot color and process color tint combination. For more on spot color and tint methods, please see Ser. No. 14/616,686, Data Hiding for Spot Colors in Product Packaging. For more on sparse marking, please see our U.S. application Ser. No. 14/725,399, Sparse Modulation for Robust Signaling and Synchronization.

Additionally, these methods are suitable for print runs in which a material layer bearing the encoded payload is overwritten unto the package, such as ink jet application of ink or an application of a varnish, lacquer or UV cured coating. Please see our US Published Application US 20020118394, which is hereby incorporated by reference.

They are also suitable for embodiments in which the imager of the press system has the capability to apply the signal adjustments for the unique payload using laser, photographic, thermal, or other technique. These adjustments may be made to the substrate, prior to printing the design on it. Alternatively, they may be made over the ink layers printed on the substrate.

In one approach, a first print run is dedicated to applying a static image to N printed pieces. A second print run then applies different adjustments for the variable payload to the N printed pieces.

Alternatively, the imager of the press has plural application stages that apply different marking to the same substrate area of a printed piece, before advancing to the next printed piece.

For example, packages may be pre-printed with the exact same image in a first print run, and then serialized by running the pre-printed package substrate through a fast, variable marking system, which applies adjustments via material application (ink or varnish) or exposure to pressure, heat, laser, or photographic marking methods. This fast, variable marking system may also be integral to a traditional press assembly, so that printed pieces pass through a digital marking station after conventional printing.

A variable payload marking system may also be integral to the digital press system, in which static images of spot and process colors are applied to a substrate, using a first imager assembly, and the adjustments for the digital payload are applied earlier on the substrate, or later, after the spot and ink layers are applied.

The encoding method is preferably tailored to the color scheme and branding of the shipper, and the technologies described above have the flexibility to accomplish this tailoring. The process colors of the digital press, for example, may be used to apply the same distinctive design on each container, and also apply adjustments to each printed piece to insert a unique payload. Some shippers may use a spot color or spot colors associated with corporate branding. The color scheme for the branding may be accommodating using techniques referenced and described in this document.

For the sake of completeness, we also note that other serialization methodologies may be used for this use case. Please see, for example, methods for serializing print media in US Patent Application Publication 20150016664, which is hereby incorporated by reference.

The unique payload marking is also designed to be compatible with inexpensive and ubiquitously deployed camera based imaging devices, for both industrial and consumer use cases. In the industrial use case, such as in a distribution facility, auto-ID equipment is typically configured to read traditional barcodes. Such devices typically use red illumination, such as a red LED, to read barcodes from images captured in a spectral neighborhood around 660 nm. For example, this equipment often employs red illumination and monochrome image capture, e.g., using a CMOS array. Some equipment employs color sensors and/or other forms of illumination (e.g., pulsing LEDs) to capture image content in additional spectral bands. For more on this topic, please see our published application 20130329006, which is hereby incorporated by reference. To extend the compatibility of the signal encoding methodology, one preferably should design it to handle the more limiting case (e.g., reading at 660 nm). The payloads, therefore, are inserted so as to be read from images captured in the spectral range of the more limited capture devices.

In the consumer use case, digital cameras on mobile phones, tablets and other consumer electronics typically have color sensors to capture color pictures and video. These devices use color filter arrays to capture color images in which each pixel has three or more color separations, such as RGB. Since the payloads are extractable for the more limited case of certain traditional barcode scanning equipment, they are also extractable from RGB images or video. Please see incorporated documents for more on extracting payloads from camera captured images, including, for example, US Published Applications 20130329006, 20100150434 and 20140119593, and U.S. Pat. No. 6,614,914.

Figure 6:
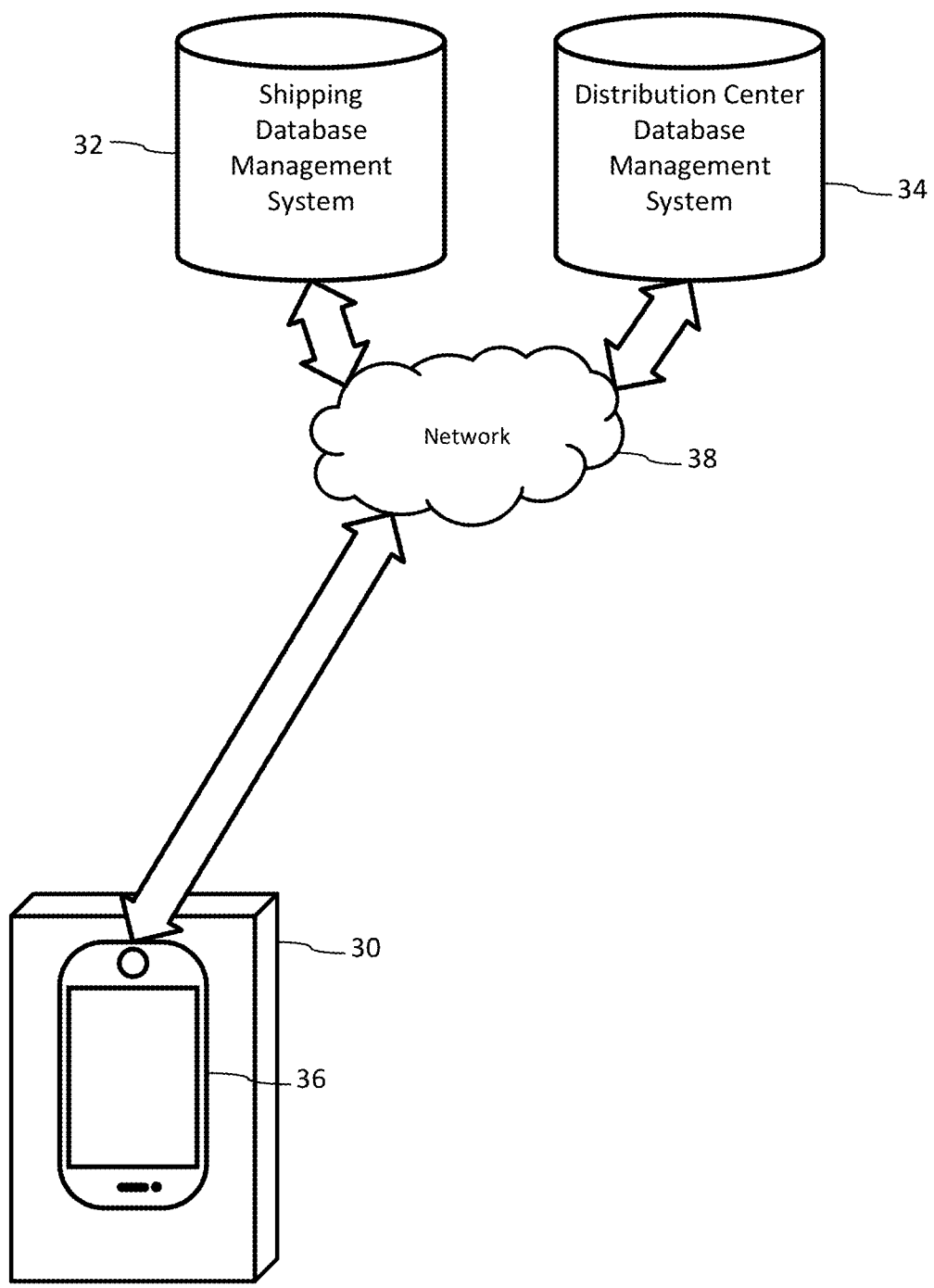
FIG. 6 is a diagram illustrating use of the unique digital payload on a package for different applications.

Having described the unique marking process and digital capture and extraction of the payload, we now describe how the unique payloads are used. FIG. 6 is a diagram illustrating applications the unique digital payload on a container. When a container 300 is put to use, the unique payload encoded on it is assigned an application number for that use. For example, in a shipping application, the payload is assigned to an active tracking number in a shipping database management system 32.

Other applications can assign different meaning to that container by assigning the payload to an application number within the application. For example, FIG. 6 shows another application in which the payload has a different meaning for use in a distribution center database management system 34. For example, it may be assigned to an application number within the distribution center object handling system. Various other applications may associate the payload with other metadata particular to the application.

The status of the container is updated by reading the unique payload and updating the database management system for the desired application or applications.

The unique payload woven over the surface of the container enhances both the consumer and industrial use case. From the consumer perspective, the technology makes shipping easier and tracking more reliable. The consumer obtains the container 30. To set up a shipment, she scans the container 30 with the camera of her mobile device 36. An application running on her device (e.g., the shipper's mobile application) uses the mobile operating system to display a user interface, receive input via the touch screen, voice command, etc., capture images of the container, and establish network communication through network 38 to the shipping database management system 32.

The application decodes the unique digital payload from images captured of the container 30 and provides it to the database 32. In response, the database validates that the unique payload is valid and allows the consumer to set up a shipment using the container 30.

To assign a destination, the application provides options for entry of the destination address. One option is for manual entry of the address via the user interface of the application. Another is selection of a contact within the contact database on the mobile device. In the latter case, the application has access to the contact database maintained by the mobile operating system. By selecting the contact, the consumer associates the contact's name and address with the destination of the shipment. The application provides the destination address, source address, shipping priority and user account identification to the database 32. The latter may already be associated with the consumer's account with the shipping operation. The application also provides for mobile payment of the shipping cost. The database 32 checks the validity of the information provided and sends back the shipping instructions to the consumer for verification. When the consumer has verified the shipping information and completed payment with the shipping system 32, it activates the unique payload by assigning a tracking number, setting up a database record for managing shipment, and issuing instructions to its shipping infrastructure to pick up the container from the consumer and deliver it to the destination. No additional labeling need be applied to the container to complete the shipment, though as noted, other labels and barcodes may be applied as appropriate without impacting the readability of the payload.

From the shipper's perspective, its personnel and handling facilities are equipped with camera based imaging devices capable of imaging the container and extracted its unique payload. When the shipper's delivery personnel or auto-ID equipment encounter the package, e.g., during pick up, transport, handling in distribution centers, and delivery at the destination, they read the payload from images captured of the container with a camera based imaging device. As noted above, the payload may be read with camera based barcode scanning equipment and mobile devices. At each point, the reading device updates the shipping database 32 with status information, such as location, time, personnel who handled it. Database 32 makes a subset of this information available to the consumer via a web interface (including the mobile application). The consumer may also opt to have the database 32 issue shipping status notifications to the mobile device via notifications to the mobile application, text messaging, and/or email.

Personnel of the shipper are equipped with readers that enable them to view shipping information linked to the unique payload. Since the container does not need, nor necessarily use human readable destination information, the shipper's personnel obtain this information through the user interface of the application running on their reader devices. These may be ruggedized mobile devices, such as a smart phone or tablet.

Figure 7:
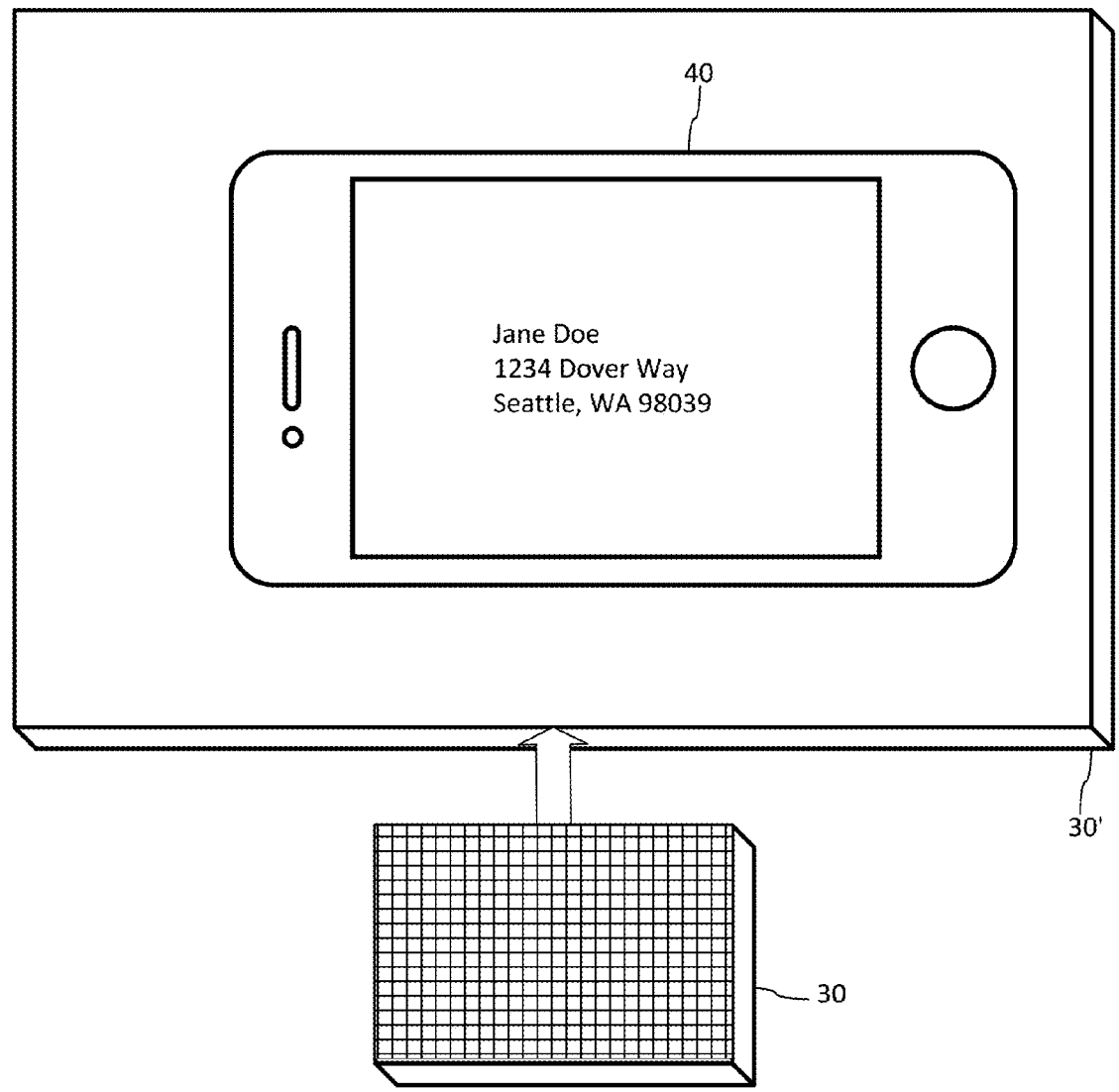
FIG. 7 is a diagram illustrating an augmented reality user interface on a mobile device for viewing labeling information linked to a unique payload.

FIG. 7 is a diagram illustrating an augmented reality user interface on a mobile device for viewing labeling information linked to a unique payload. The container 30 lacks any overt labeling or shipping information because that information is linked via the unique payload encoded over the surface of it. The depiction of the surface of the container 30 in FIG. 7 shows a pattern of lines, which is merely representative of any type of graphic design elements, including logos and other branding, text, graphics, images etc. that the shipper wishes to put on its containers.

At any point in the delivery process, a shipper employee may pass his mobile device 40 over the surface of the container 30' to capture image frames of it via the camera in the device. This operation is shown in FIG. 7 as the container 30 being positioned under the mobile device 40 (the arrow from 30 to 30'). The device 40 decodes the unique payload and retrieves the shipping information from the database 32 via network 38. It then renders the shipping information on the display of the mobile device 40. This operation may be implemented as an augmented reality (AR) display, in which an image of the container 30' is depicted on the display of the mobile device 40 from live camera feed or snap shot, with a machine rendering of a label showing pertinent destination information as shown, superimposed on the camera feed or snap shot of the container on the display of the mobile device 40. For more details on augmented reality implementation, please see 20140119593 incorporated above. Likewise, the consumer mobile application may also provide a similar AR display, which different renderings provided based on the state of the container (available for new shipment, in delivery mode for acceptance, etc.)

The user interface of the mobile device may be implemented on a touch screen, enabling the employee to enter status information, including location, time, stage of shipment (e.g., pick up, delivery, transport, distribution center, etc.). Several different form factors may be deployed, depending on the pragmatic needs of the shipper personnel. One form factor is a delivery truck unit that allows the delivery person and truck loaders to present objects to an image capture device (device with digital camera) and display shipping information. Another form factor is a wearable computing device (e.g., like Google Glass wearables or the like).

Material handling equipment and machine vision systems are additional examples of devices that assist in delivery and update status of the container. Drones, robots, and other unmanned vehicles used in container transport are just a few additional examples.

When the container is delivered, it again enters a consumer's domain. At this point, the delivery person or unmanned delivery vehicle makes a status entry to update the status to "delivered." The recipient may use the shipper's mobile application, as the sender did, to scan the container, access shipping information, and indicate acceptance of the container. As noted, the consumer's scan of the container may present an AR experience with information about the package that is uniquely pertinent to the recipient rendered on the recipient's mobile device.

It is possible for the container to be re-used, so the database system 32 de-activates the unique payload of the container from the tracking number. This allows the container to be re-used, in a similar fashion. One example of re-use is for merchandise returns, for example.

Additional validation steps are preferably employed to improve the efficiency and reliability of shipping. When activating the shipment upon a digital read of the payload in the container, an electronic notice is sent to the logistics supplier and intended recipient, showing shipper, addressee, and description of the pending delivery, etc. The system's validation process sends an electronic notification to the sender and recipient (e.g., via electronic mail, mobile application notification, text message, or the like), asking for confirmation of the shipping details. The sender and/or recipient then, in response, provide any additional instructions for the shipment, including any special requests to the logistics supplier. The recipient confirms, preferably prior to shipment, mitigating risks of misaddressing shipment. Through this process, the logistics supplier has an opportunity to respond to special requests or provide details of estimated delivery. Upon receipt, the recipient captures an image of the container with his mobile device through a mobile device application. The mobile application sends a notification to the shipper and logistics supplier of receipt, closing the loop. If the recipient wishes to initiate a return, he does so by replicating the shipment process, an indicating that a return is being requested.

Operating Environment

Figure 8:
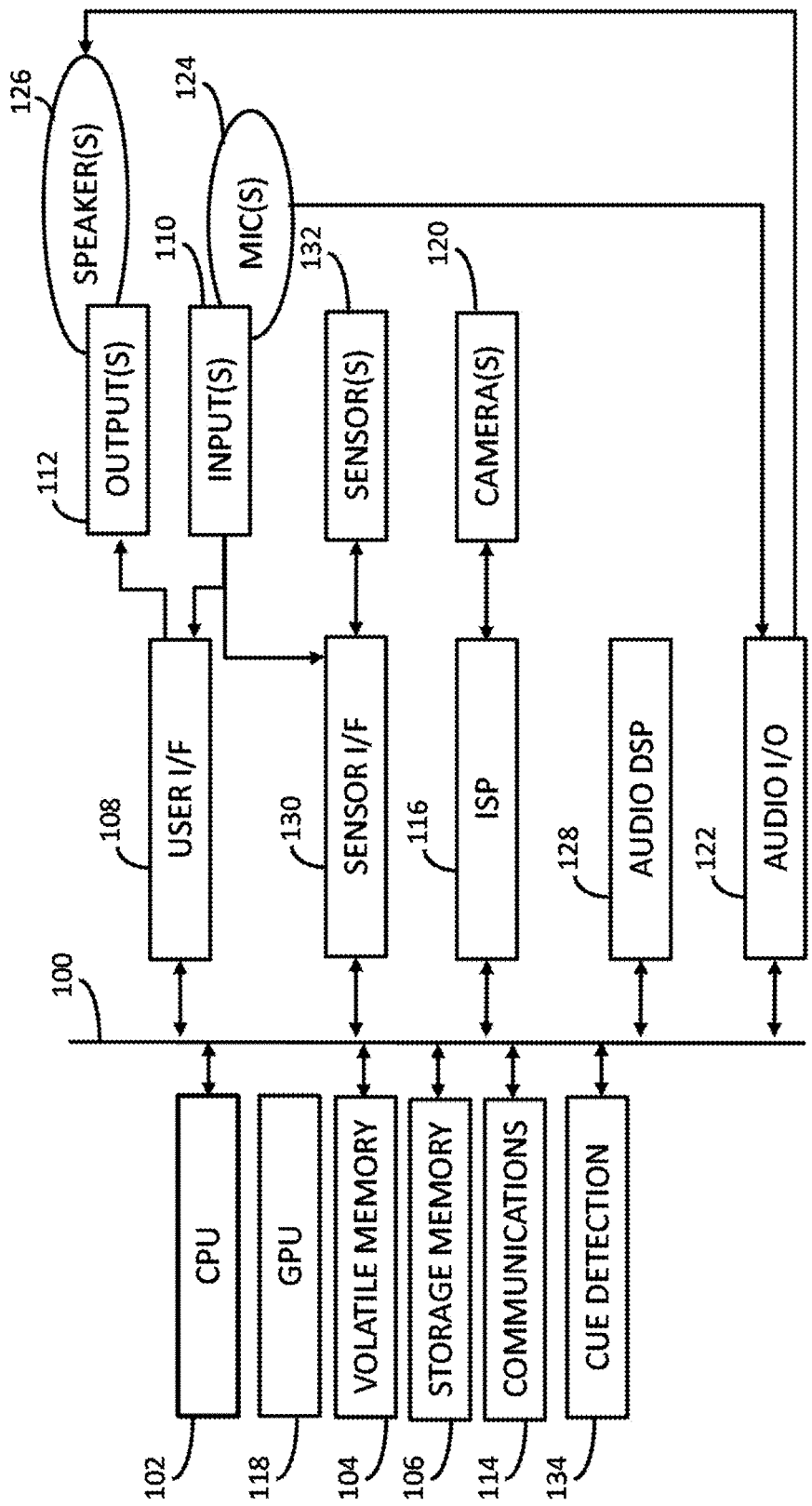
FIG. 8 illustrates an electronic device for executing image preprocessing, generating images with unique payloads, and payload decoding.

For the sake of illustration, FIG. 8 is a diagram of an electronic device in which the components of the above embodiments may be implemented. These components include the components of the DFE, press, and devices with imaging capability for capturing images of marked objects and processors to decode digital payloads from these images. It is not intended to be limiting, as the embodiments may be implemented in other device architectures or electronic circuitry.

Referring to FIG. 8, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 28 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104. The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying images, including our reference and payload signals, to objects, such as 2D and 3D printers, etching, engraving, embossing, laser marking, etc., in additional to the digital press technology described above.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 28, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Notwithstanding any specific discussion of the embodiments set forth herein, the term "module" may refer to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., encoding and decoding of differential modulation within host image or audio content) are first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Implementation can additionally, or alternatively, employ electronic circuitry in the form of a Field-Programmable Gate Array (FPGA). The FPGA configuration is specified using a hardware description language (HDL), similar to that used for an ASIC.

Exemplary Embodiments

The following are exemplary embodiments.

A1. A method for producing unique instances of a host image from a host image design file, each unique instance having a unique digital payload, the method comprising:

determining embedding parameters to embed a reference digital watermark in the image from the host image design file;

based on the embedding parameters, computing allowable adjustments for converting the host image into final marked images, wherein each of the final marked images is a unique instance of the host image from the host image design file, and wherein the allowable adjustments provide an allowable adjustment for embedding locations within plural tiles of the host image for plural unique digital payloads; and forming a database of the allowable adjustments, the database being configured to provide particular payload adjustments from the allowable adjustments for the embedding locations according to values within a watermark signal tile of a unique payload.

A2. The method of embodiment A1 wherein the reference digital watermark comprises a fixed component of a final digital watermark, the fixed component being common to each unique instance, and the particular payload adjustments cause the final digital watermark to have a unique digital payload.

A3. The method of embodiment A2 wherein the fixed component comprises a synchronization signal.

A4. The method of embodiment A2 wherein the reference digital watermark acts as a proxy for the final digital watermark.

A5. The method of embodiment A1 wherein the allowable adjustments are generated to be applied to a pre-rasterized version of the host image.

A6. The method of embodiment A1 further comprising:
receiving, in a raster image processor, adjustment quantities and locations of the particular payload adjustments for a unique digital payload, and making the particular adjustments to pixels of the host image to encode the unique digital payload.

A7. The method of embodiment A1 further comprising:
obtaining a rasterized version of the host image;
obtaining from the database the adjustment quantities and locations of the particular payload adjustments for a unique digital payload, and making the particular adjustments to pixels of the rasterized version of the host image to encode the unique digital payload.

A8. The method of embodiment A1 further comprising:
obtaining a unique payload;
converting the unique payload into a watermark signal tile;
mapping the watermark signal tile to locations within the host image; and
fetching the particular payload adjustments from the database.

A9. The method of embodiment A1 wherein the embedding parameters are derived from a visibility map comprising color difference metric values at embedding locations within the image.

A10. The method of A9 wherein the embedding parameters comprise a mask comprising scale factors for embedding locations, the scale factors obtained from the visibility map.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations described above may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

What is claimed is:

1. A method for producing unique instances of a host image from a host image design file, each unique instance having a unique digital payload, the method comprising:
    embedding a reference digital watermark in the host image from the host image design file to produce a marked base image;
    computing allowable adjustments for converting the marked base image into final marked images, wherein each of the final marked images is a unique instance of the host image from the host image design file, and wherein the allowable adjustments provide an allowable adjustment for embedding locations within plural tiles of the host image for plural unique digital payloads;
    forming a database of the allowable adjustments, the database being configured to provide particular payload adjustments from the allowable adjustments for the embedding locations according to values within a watermark signal tile of a unique payload; and
    receiving, in an image processor, adjustment quantities and locations of the particular payload adjustments for a unique digital payload, and making the particular payload adjustments to pixels of the host image to encode the unique digital payload.

2. The method of claim 1 wherein the reference digital watermark comprises a fixed component of a final digital watermark, the fixed component being common to each unique instance, and the particular payload adjustments cause the final digital watermark to have a unique digital payload.

3. The method of claim 2 wherein the fixed component comprises a synchronization signal.

4. The method of claim 2 wherein the reference digital watermark acts as a proxy for the final digital watermark.

5. The method of claim 1 wherein the allowable adjustments are generated to be applied to a pre-rasterized version of the marked base image.

6. The method of claim 1 further comprising:
    making the particular payload adjustments to pixels of the marked base image to encode the unique digital payload; wherein the image processor comprises a raster image processor.

7. The method of claim 1 further comprising:
    obtaining a rasterized marked base image;
    obtaining from the database the adjustment quantities and locations of the particular payload adjustments for a unique digital payload, and making the particular payload adjustments to pixels of the rasterized marked base image to encode the unique digital payload.

8. The method of claim 1 further comprising:
obtaining a unique payload;
converting the unique payload into a watermark signal tile;
mapping the watermark signal tile to locations within the host image; and
fetching the particular payload adjustments from the database.

9. The method of claim 1 wherein the watermark signal tile comprises a payload tile, the method comprising:
sending the payload tile from a digital front end to a press to serialize a printed instance of the host image during operation of the press;
within the press, reading the payload tile, and based on the values of the payload tile indicating a positive or negative adjustment, selecting a positively or negatively adjusted pixel for an embedding location corresponding to a location within the payload tile, and writing the selected adjusted pixel to a final rasterized image in memory of the press.

10. The method of claim 9 wherein sending the payload tile comprises sending an alpha blend channel to the press, the alpha blend channel comprises at least one payload tile, which is replicated to cover plural contiguous pixel blocks of the host image, and wherein the selecting comprises selecting from among a first image array of positively adjusted pixels and a second image array of negatively adjusted pixels.

11. A digital press system for producing unique instances of a host image from a host image design file, each unique instance having a unique digital payload, the system comprising:
a digital front end configured to obtain a marked base image, the marked base image comprising the host image from the host image design file embedded with a reference digital watermark, the digital front end configured to provide a rasterized version of the marked base image and allowable adjustments, the digital front end further configured to provide a payload tile specifying embedding locations where adjustments selected from the allowable adjustments are to be made to the marked base image to encode a variable digital payload in the marked base image;
a press in communication with the digital front end, the press comprising memory and a processor, and an imager for applying a final marked image to a substrate; the processor configured to obtain the payload tile, allowable adjustments and the rasterized version of the marked base image from the digital front end, and configured to read the payload tile and make adjustments to the rasterized version of the marked base image to form a final marked image encoded with the variable digital payload.

12. The system of claim 11 wherein the digital front end is configured to send the payload tile within an alpha blend channel to the press, the alpha blend channel comprising at least one payload tile, which is replicated to cover plural contiguous pixel blocks of the host image, and wherein the allowable adjustments comprise a first image array of positively adjusted pixels and a second image array of negatively adjusted pixels, and wherein the processor is configured to select from among the first image array of positively adjusted pixels and the second image array of negatively adjusted pixels, based on values of the payload tile communicated to the press through the alpha blend channel.

13. The system of claim 11 wherein the reference digital watermark comprises a fixed component of a final digital watermark, the fixed component being common to each unique instance, and the adjustments to the rasterized version of the marked base image cause the final digital watermark to have a unique digital payload.

14. The system of claim 13 wherein the fixed component comprises a synchronization signal.

15. The system of claim 13 wherein the reference digital watermark acts as a proxy for the final digital watermark.

16. The system of claim 11 wherein the digital front end comprises a raster image processor configured to rasterize the allowable adjustments, the digital front end configured to provide a rasterized version of allowable adjustments to the press for writing selected adjustments from the rasterized version of the allowable adjustments into memory to form the final marked image.

17. A non-transitory computer readable medium on which is stored instructions, which when executed by a processor, perform a method for producing unique instances of a host image from a host image design file, each unique instance having a unique digital payload, the method comprising:
embedding a reference digital watermark in the host image from the host image design file to produce a marked base image;
computing allowable adjustments for converting the marked base image into final marked images, wherein each of the final marked images is a unique instance of the host image from the host image design file, and wherein the allowable adjustments provide an allowable adjustment for embedding locations within plural tiles of the host image for plural unique digital payloads;
forming a database of the allowable adjustments, the database being configured to provide particular payload adjustments from the allowable adjustments for the embedding locations according to values within a watermark signal tile of a unique payload; and
receiving, in an image processor, adjustment quantities and locations of the particular payload adjustments for a unique digital payload, and making the particular payload adjustments to pixels of the host image to encode the unique digital payload.

18. The computer readable medium of claim 17 wherein the reference digital watermark comprises a fixed component of a final digital watermark, the fixed component being common to each unique instance, and the particular payload adjustments cause the final digital watermark to have a unique digital payload.

19. The computer readable medium of claim 18 wherein the fixed component comprises a synchronization signal.

20. The computer readable medium of claim 18 wherein the reference digital watermark acts as a proxy for the final digital watermark.

* * * * *